US011390411B2

(12) United States Patent
Golad

(10) Patent No.: US 11,390,411 B2
(45) Date of Patent: Jul. 19, 2022

(54) STICKER PLACING DEVICE AND CARTRIDGE FOR USE THEREIN

(71) Applicant: Adar Golad, Hattem (NL)

(72) Inventor: Adar Golad, Hattem (NL)

( * ) Notice: Subject to any disclaimer, the term of this patent is extended or adjusted under 35 U.S.C. 154(b) by 224 days.

(21) Appl. No.: 16/482,896

(22) PCT Filed: Jan. 31, 2018

(86) PCT No.: PCT/NL2018/050067
§ 371 (c)(1),
(2) Date: Aug. 1, 2019

(87) PCT Pub. No.: WO2018/143801
PCT Pub. Date: Aug. 9, 2018

(65) Prior Publication Data

US 2020/0010230 A1 Jan. 9, 2020

(30) Foreign Application Priority Data

Feb. 1, 2017 (NL) ..................................... 2018288

(51) Int. Cl.
*B32B 41/00* (2006.01)
*B65C 11/00* (2006.01)

(52) U.S. Cl.
CPC ................................. *B65C 11/002* (2013.01)

(58) Field of Classification Search
CPC .................................................... B65C 11/002
USPC .................... 156/60, 64, 350, 351, 378, 379
See application file for complete search history.

(56) References Cited

U.S. PATENT DOCUMENTS 6,206,070 B1 3/2001 Salmon
7,032,775 B1 4/2006 Almeer et al.
2004/0155052 A1 * 8/2004 Fore ......................... B65C 9/10
221/235

FOREIGN PATENT DOCUMENTS

DE 128922 C 3/1902

OTHER PUBLICATIONS

International Search Report from PCT Application No. PCT/NL2018/050067, dated Apr. 6, 2018.

(Continued)

*Primary Examiner* — Michael N Orlando
*Assistant Examiner* — Joshel Rivera
(74) *Attorney, Agent, or Firm* — Workman Nydegger

(57) ABSTRACT

A sticker placing device is provided for placing stickers and/or patches onto a surface. The sticker placing device comprises: a cylindrical guiding body having an upper opening, a lower opening and a guiding channel extending therebetween; a sticker cartridge for holding a stack of stickers and/or patches, which sticker cartridge is insertable into the guiding channel via the lower opening; and a sticker placer which is moveable connected to the guiding body and which comprises a pusher which extends at least partly into the sticker cartridge and the guiding body for pushing onto the stack, wherein the sticker cartridge comprises first coupling members and the sticker placer comprises second coupling members. The first and second coupling members are configured to form a one-way coupling. The one-way coupling allows movement of the sticker cartridge in the insert direction and blocks movement in a direction opposite to the insert direction.

23 Claims, 5 Drawing Sheets

(56) References Cited

OTHER PUBLICATIONS

Netherlands Search Report from NL Application No. 2018288, dated Oct. 5, 2017.

* cited by examiner

STICKER PLACING DEVICE AND CARTRIDGE FOR USE THEREIN

BACKGROUND

The invention relates to a sticker placing device comprising a sticker cartridge for holding a stack of stickers and/or patches, which sticker placing device is adapted for placing stickers and/or patches on a surface such as a paper sheet. The invention furthermore relates to a cartridge for use in said sticker placing device.

Such a sticker placing device is known from U.S. Pat. No. 6,206,070, in which a reciprocating punch member is described, which is actuated by means of an actuating member to form a hole within a sheet of paper positioned on the base. The hole punch also includes a dispensing sleeve positioned about the punch member, defining a space between an inner wall of the dispensing sleeve and the punch member, in which reinforcing members are positioned for attachment to a sheet of paper when the punch member is actuated to form a hole within a sheet of paper. In order to position the dispensing sleeve about the punch member, the dispensing sleeve includes internal threading along its proximal end which engages a threaded abutment extending from the actuating member.

It is an object of the present invention to eliminate or to reduce one or more disadvantages of the known sticker placing device or to provide an alternative sticker placing device.

SUMMARY OF THE INVENTION

According to a first aspect, the invention provides a sticker placing device for placing stickers and/or patches onto a surface such as a paper sheet, the sticker placing device comprising: a cylindrical guiding body having an upper end with an upper opening, a lower end with a lower opening and a guiding channel extending between the lower end and the upper end; a sticker cartridge for holding a stack of stickers and/or patches, which sticker cartridge is insertable in an insert direction into the guiding channel via the lower opening, wherein the sticker cartridge comprises a tubular cartridge body with a dispensing opening and an upper opening; and a sticker placer which is moveable connected to the guiding body and which comprises a pusher which extends at least partly into the sticker cartridge and the guiding body via the upper opening of the sticker cartridge and the upper opening of the guiding body for pushing onto the stack of stickers and/or patches within the sticker cartridge, wherein the sticker placer is moveable between a rest position, in which the sticker placer is located at or near the upper end of the guiding body, and a placing position, in which the guiding body is positioned within the sticker placer and the sticker and/or patch is stuck to the surface, wherein the sticker cartridge comprises first coupling members and the sticker placer comprises second coupling members, wherein the first and second coupling members are configured to form a one-way coupling, wherein the one-way coupling allows movement of the sticker cartridge in the insert direction and blocks movement in a direction opposite to the insert direction.

In the sticker placing device according to the first aspect of the invention, the sticker cartridge can be placed within the guiding channel of the guiding body without coupling the first coupling members and the second couplings members to each other. Subsequently, a user of the sticker placing device can use the sticker placing device to place a sticker onto the surface, for example a paper sheet. During placement of the sticker onto the surface, the sticker cartridge is further pushed and inserted in the insert direction into the sticker applying device, thereby coupling the sticker cartridge to the sticker applying device by coupling the first coupling members and the second coupling members to each other. The sticker cartridge can thus be coupled to the sticker applying device together with placing the first sticker onto the paper sheet, which is a relatively simple act for a user of the sticker placing device.

In an embodiment the sticker placer is rotatable around the longitudinal axis of the guiding body with respect to the guiding body, wherein the sticker placer is rotatable between a coupling position, in which the first and second coupling members are in engagement or may be brought into engagement with each other, and a release position, in which the first and second coupling members are out of engagement and movement of the sticker cartridge in a direction opposite to the insert direction is allowed. By being able to bring the first and second coupling members out of engagement by rotating the sticker placer around the longitudinal axis of the guiding body, the sticker cartridge may be removed relatively simple from the sticker placing device. It is noted that deformation of at least one of the first coupling members and the second coupling members is prevented by rotating the first and second coupling members out of engagement, which may have a positive effect to the durability of the sticker placing device.

In an embodiment the pusher is a cylindrical pusher with a pushing face directed towards the stack of stickers and/or patches in the sticker cartridge, wherein the first coupling members are located at the inner surface of the tubular cartridge body of the sticker cartridge, and the second coupling members are located at the outer surface of the cylindrical pusher adjacent to the first coupling members when the sticker placer is in the coupling position. In a further embodiment the first coupling members circumferentially extend over a part of the inner surface, and the second coupling members circumferentially extend over a part of the outer surface of the cylindrical pusher. Due to the placement and the structure of the first and second coupling members with respect to each other, it is relatively simple to bring the first and second coupling members into engagement with each other or to bring the first and second coupling members out of engagement.

In an embodiment the first coupling members extend over a first length in a direction parallel to the longitudinal direction of the guiding body, and the second coupling members extend over a second length in a direction parallel to the longitudinal direction of the guiding body, wherein the second length is larger than the first length. Due to the length difference between the first coupling members and the second coupling members, the sticker cartridge may be moved further into the sticker placing device in the insert direction when the number of stickers in the sticker cartridge is reduced. It may therewith be established that the pusher remains close to or in contact with the upper sticker of the stack of stickers within the sticker cartridge, at least when the sticker placing device is in the placing position.

In an embodiment the sticker placer comprises an engagement head which is connected to the top side of the pusher and extending radially outwards therefrom. In a further embodiment the engagement head extends radially outwards beyond the outer circumference of the guiding body. By providing an engagement head which is wider than the guiding body and thus also the sticker cartridge, a user may easily engage the engagement head and such an engagement is relative easy to hold during placement of one or more stickers onto a surface.

In an embodiment the engagement head is rotationally fixed to the pusher. This is advantageous because the first and second coupling members may be brought out of engagement by rotating the engagement head and therewith the pusher. Removal of the sticker cartridge from the sticker placing device may thus be effectuated by a single act which is rotating of the engagement head.

In an embodiment the engagement head is provided with a first receiving notch for receiving at least a part of the sticker cartridge. In a further embodiment the sticker placer comprises an engagement sleeve positioned around the pusher and the guiding body and extending parallel to the longitudinal axis thereof, and wherein the engagement head is provided with a second receiving notch for receiving at least a part of the engagement sleeve. The engagement sleeve provides the possibility to a user of the sticker placing device to easily grab the sticker placing device.

In an embodiment the engagement head comprises a lower head part and an upper head part which is removable connected to the lower head part, wherein the first and/or second receiving notch are provided in the lower head part. It is advantageous to be able to remove the upper head part in order to access the inside to the sticker placing device in order to be able to replace parts of the sticker placing device for example.

In an embodiment the engagement sleeve comprises one or more projections projecting radially inwards or outwards with respect to the longitudinal axis of the guiding body, wherein the second receiving notch is provided with one or more movement openings in one of the side walls thereof, which one or more movement openings extend over a part of the side wall in the circumferential direction. By placing the projection(s) inside the movement opening(s) of the second receiving notch of the engagement head, it is effectuated that the engagement sleeve and the engagement head may rotate relative to each other and it is prevented that the engagement sleeve and the engagement head move relative to each other in a direction along the insert direction.

In an embodiment the upper head part comprises a reinforcing member which abuts the top side of the pusher when the upper head part is connected to the lower head part. The reinforcing member prevents the upper head part from being dented when a force is applied to the upper head part in a direction opposite to the insert direction. In an embodiment the engagement sleeve and the engagement head are rotational with respect to each other around the longitudinal axis of the guiding body. This is advantageous since a user of the sticker placing device can hold for example the engagement sleeve while rotating the engagement head for removing the sticker cartridge from the sticker placing device. The sticker cartridge may thus be removed from the sticker placing device by a relatively simple operation.

In an embodiment a space is present between and delimited by the outside of the pusher and the inside of the engagement sleeve, wherein the sticker cartridge is at least partially positioned within the space. In a further embodiment a biasing spring is provided within the space, which biasing spring on one end is secured to the sticker placer and at the other end to the guiding body, wherein the biasing spring preferably biases the sticker placer into the rest position. By biasing the sticker placer into the rest position, it is established that the usually sticky underside of the lowest sticker of the stack of stickers within the sticker cartridge is at a distance of the lower opening of the guiding body. The risk to place a sticker unintended onto a surface is herewith reduced and in the ideal case eliminated.

In an embodiment the first coupling members comprise two opposite first coupling members, wherein the second coupling members comprises two opposite second coupling members. This embodiment provides a relatively simple construction of the one-way coupling between the sticker placing device and the sticker cartridge.

In an embodiment each of the first and second couplings members has a saw-tooth shape comprising alternately inclined ascending flanks and steep transitions from the one to the next saw-tooth. In a further embodiment the inclined flanks of the first coupling members are ascending in a direction towards the dispensing opening of the sticker cartridge, and wherein the inclined flanks of the second coupling members are ascending in a direction opposite to the direction of inclining of the flanks of the first coupling members. The inclined flanks of the second coupling members are ascending in a direction parallel to the insert direction of the sticker cartridge. The opposite direction of inclination of the flanks of the first and second coupling members provides a reliable one-way coupling between the first and second coupling members, wherein movement of the sticker cartridge in the insert direction is allowed and movement of the sticker cartridge opposite to the insert direction is blocked.

In an embodiment the guiding body has orientation grooves and first orientation ribs and the sticker cartridge comprises second orientation ribs adapted for cooperation with the orientation grooves of the guiding body. Due to the cooperation of the of the orientation grooves and the second orientation ribs, whereby the orientation grooves at least partly receive the second orientation ribs, it is prevented that the guiding body and the sticker cartridge rotate with respect to each other about the longitudinal axis of the guiding body.

In an embodiment the engagement sleeve has an orientation ring surrounding the guiding body, wherein orientation indentations are provided at the inner circumference of the orientation ring, which orientation indentations are configured for cooperating with the first orientation ribs of the guiding body. Due to the cooperation of the orientation indentations and the first orientation ribs, whereby the first orientation ribs are at least partly received within the orientation indentations, it is prevented that the engagement sleeve and the guiding body rotate with respect to each other about the longitudinal axis of the guiding body.

According to a second aspect, the invention provides a sticker cartridge for use in a sticker placing device according to the first aspect of the invention.

According to a third aspect, the invention provides a computer-readable medium having computer-executable instructions adapted to cause a 3D printer to print a sticker placing device according to the first aspect of the invention, or a sticker cartridge according to the second aspect of the invention.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1A:
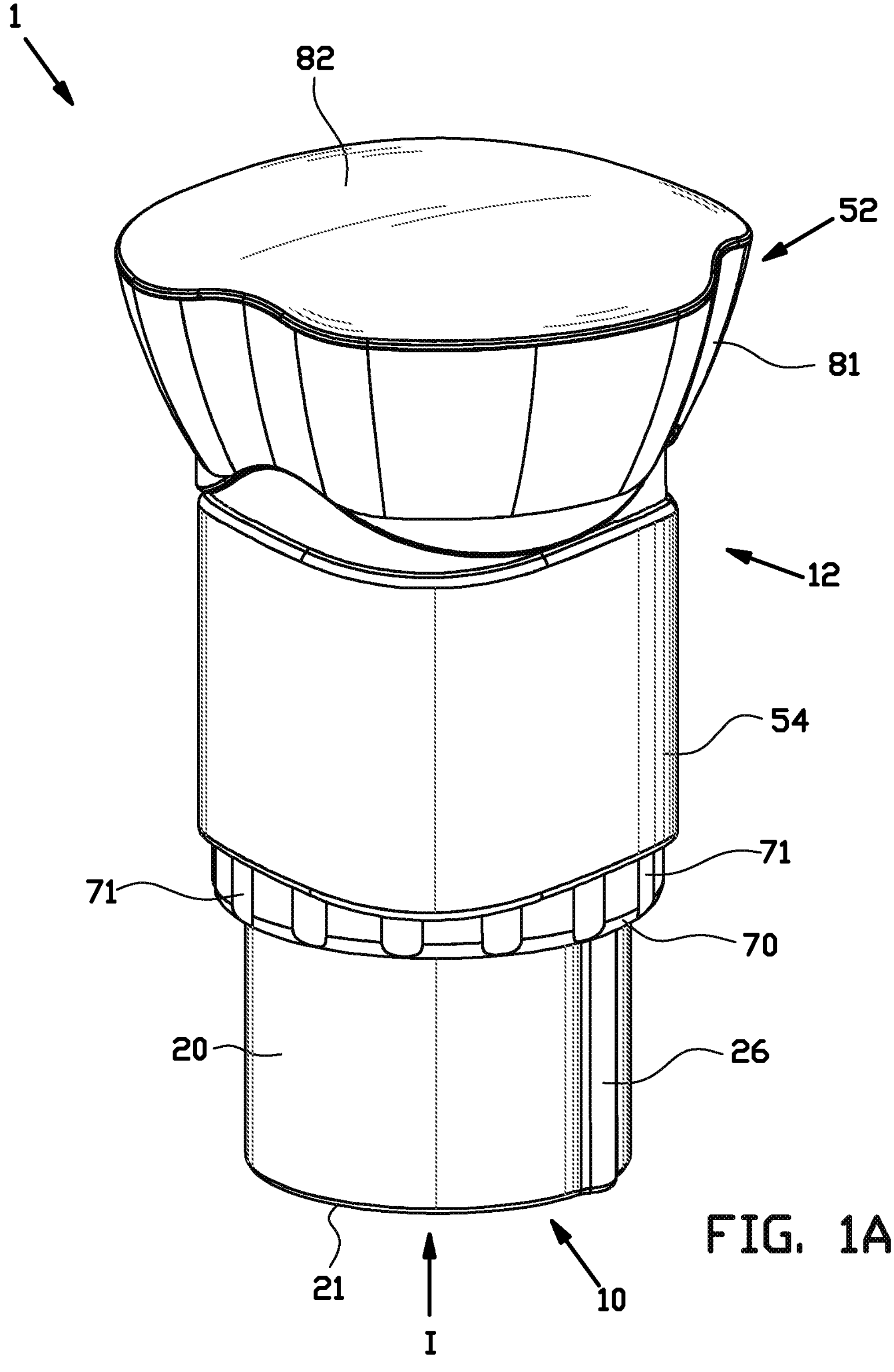
FIG. 1A shows an isometric view of a sticker placing device with an inserted sticker cartridge, in a rest position, according to an embodiment of the invention.
Figure 1B:
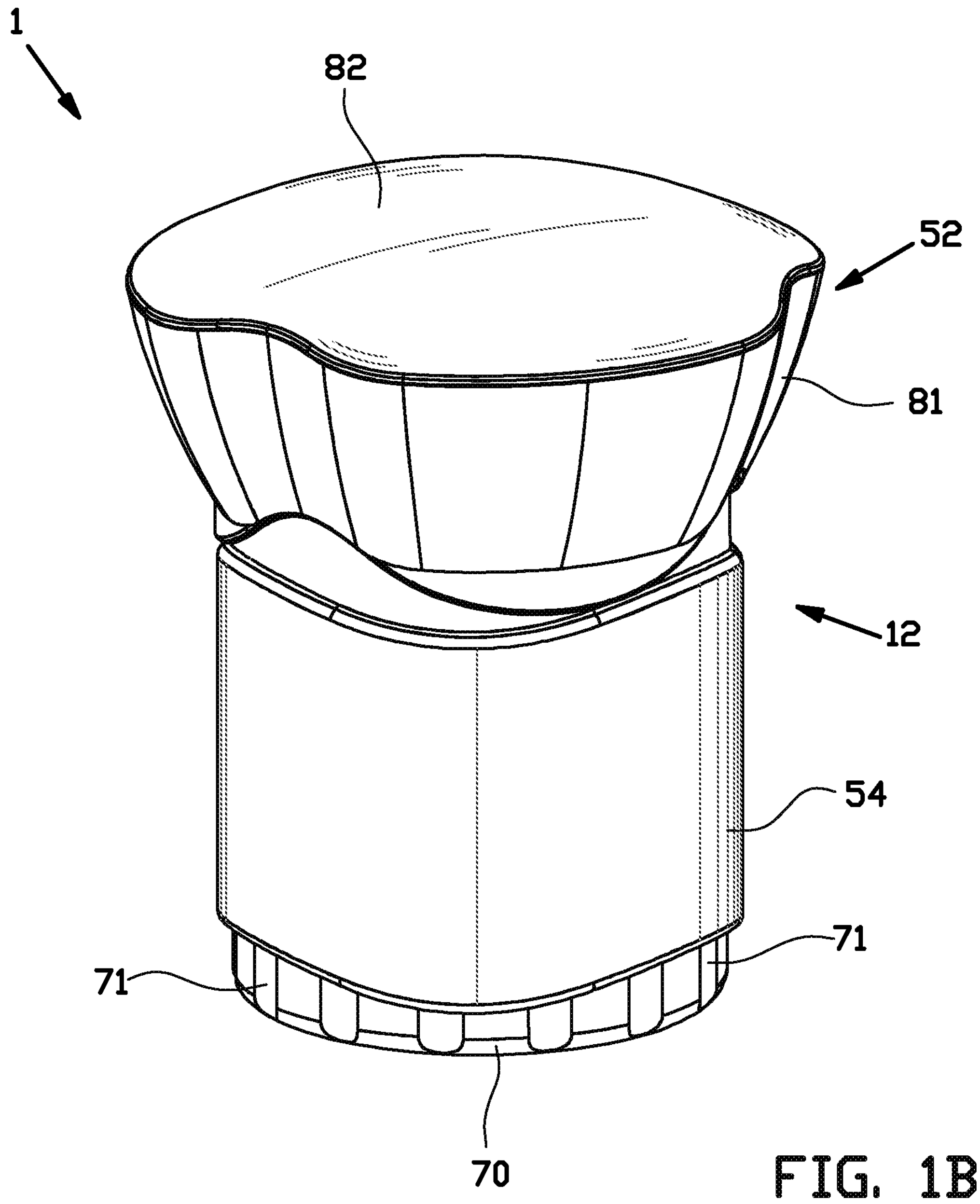
FIG. 1B shows the sticker placing device with the inserted cartridge of FIG. 1B in a placing position.
Figure 1C:
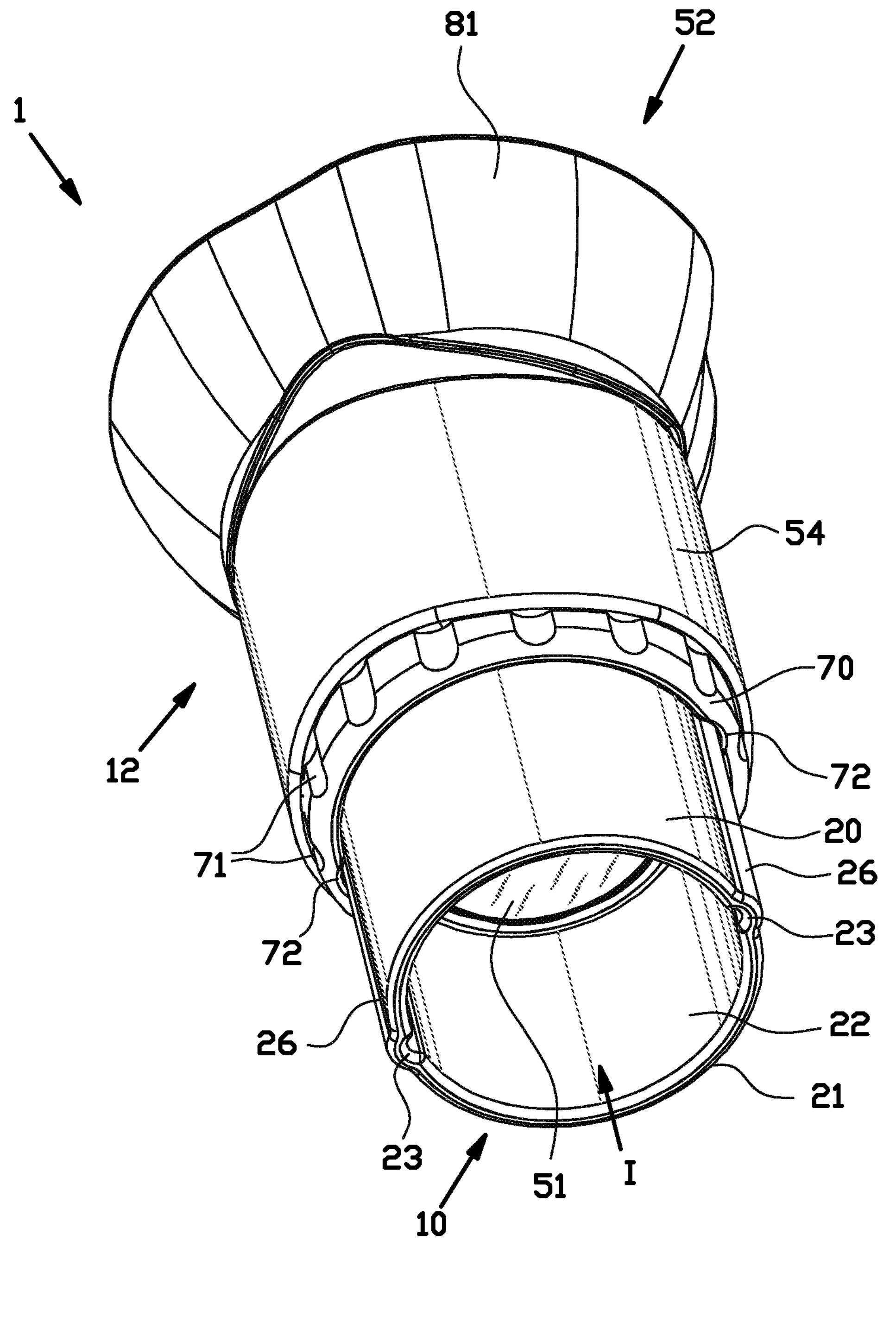
FIG. 1C shows an isometric bottom view of the sticker placing device without the sticker cartridge of FIG. 1A.

FIGS. 1A to 1C show a sticker placing device 1 in which a sticker cartridge 2 may be inserted in an insert direction I according to an embodiment of the invention. The sticker placing device 1 comprises a guiding body 10. The guiding body 10 is provided with a sticker placer 12, which sticker placer 12 is moveable between a rest position, as shown in FIG. 1A, in which the sticker placer 12 is located at or near an upper end of the guiding body 12, and a placing position, as shown in FIG. 1B, in which a sticker or a patch 3 can be applied to a surface such as a paper sheet.

As shown in FIG. 1C the guiding body 12 is formed by a tubular guiding sleeve 20, in particular a transparent guiding sleeve. The guiding sleeve 20 has a lower edge 21 at the side facing away from the sticker placer 12, which lower edge 21 bounds a lower opening 22 through which the sticker cartridge 2 can be inserted into the sticker placing device or via which a sticker 3 can be applied to the paper sheet. As shown in FIG. 1C the guiding sleeve 20 is provided with two opposite orientation grooves 23 for establishing the proper orientation of the sticker cartridge 2 with respect to the sticker placing device 1. The orientation grooves 23 are provided at the inner surface of the guiding sleeve 20 and extend in a direction parallel to the longitudinal direction of the guiding sleeve 20. FIG. 1C furthermore shows that the guiding sleeve 20 comprises first orientation ribs 26 at the outer surface of the guiding sleeve 20, which first orientation ribs 26 extend in the direction parallel to the longitudinal direction of the guiding sleeve 20.

The guiding sleeve 20 further comprises a top opening positioned within the sticker placer 12, which top opening 24 is bound by a connecting edge 25. The connecting edge 25 is adapted for connecting the guiding sleeve 20 to the sticker placer 12.

Figure 2A:
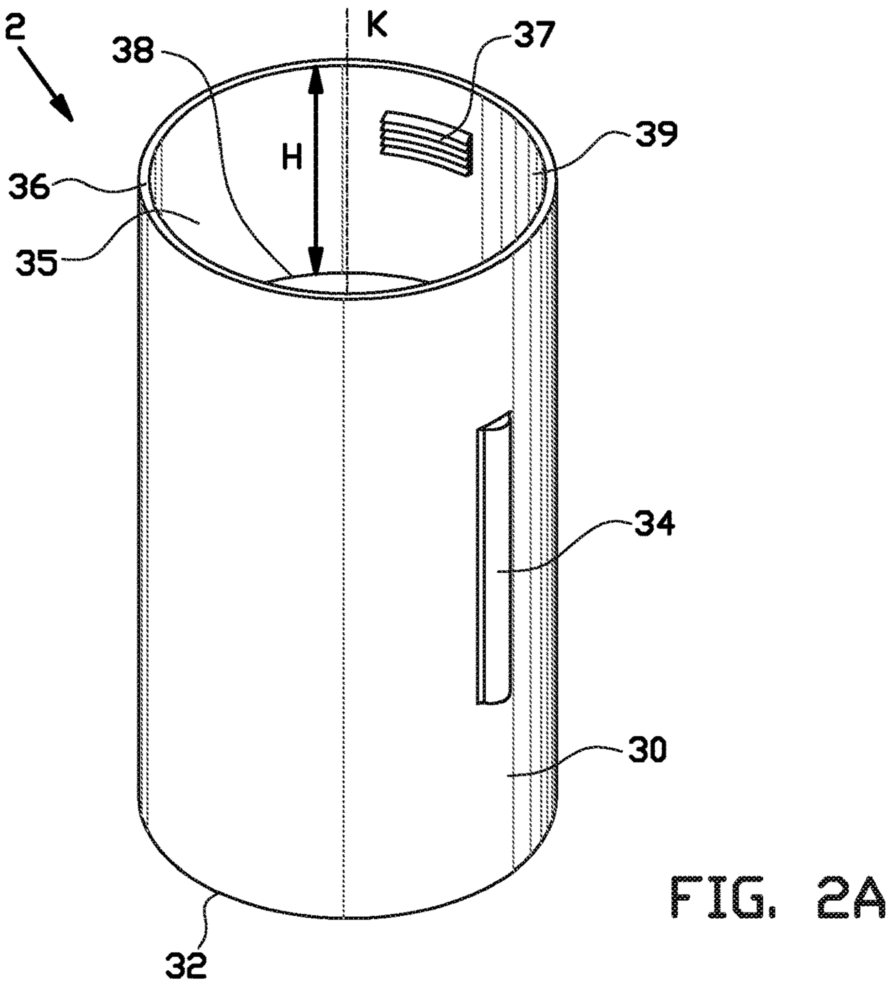
FIG. 2A shows an isometric view of the sticker cartridge of FIG. 1A.
Figure 2B:
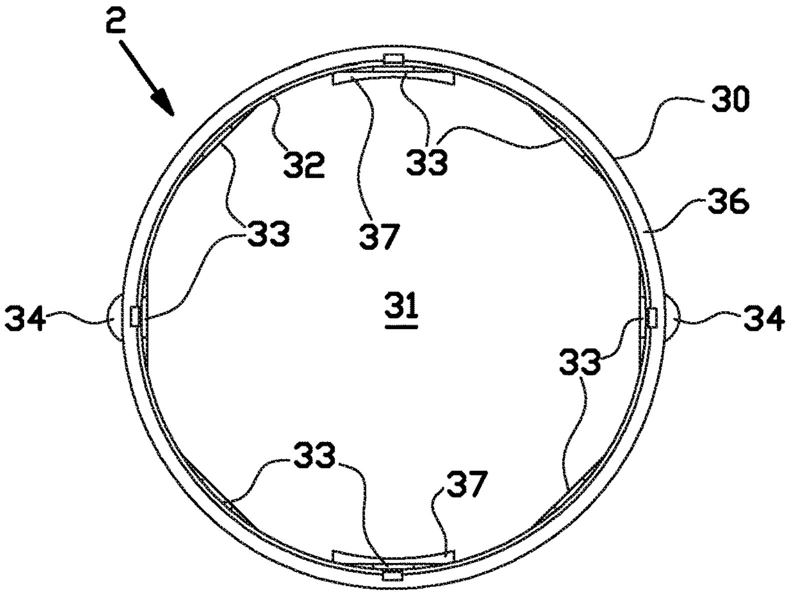
FIG. 2B shows a top view of the sticker cartridge of FIG. 2A.

As shown in FIG. 2A the sticker cartridge 2 is formed by a tubular cartridge body or cartridge sleeve 30 which confines a holding space in which a stack of stickers 3 may be inserted. At the lower end, which is the end facing away from the sticker placer 12 when inserted into the sticker placing device 1, the cartridge sleeve 30 has a dispensing opening 31 which is bound by a dispensing edge 32. Stickers leave the cartridge sleeve 30 via the dispensing opening 31 when being attached to the paper sheet. At or near the dispensing edge 32 of the cartridge sleeve 30, the cartridge sleeve 30 is provided with a number of radially inwards extending ribs 33. The radially inwards extending ribs 33 are equally distributed in the inner circumferential direction of the cartridge sleeve 30. The radially inwards extending ribs 33 are provided for separating the sticker, which is attached to the paper sheet, from the sticker directly above the attached sticker.

As shown in FIG. 2A the sticker cartridge 2, in particular the cartridge sleeve 30 comprises two opposite second orientation ribs 34 which are provided at the outer circumference of the cartridge sleeve 30 and extend along the longitudinal axis K of the cartridge sleeve 30. The second orientation ribs 34 extend over a part of the height of the cartridge sleeve 30. The second orientation ribs 34 are adapted for cooperation with the orientation grooves 23 of the guiding sleeve 22 in order to establish a proper orientation of the sticker cartridge 2 with respect to the sticker placing device 1 and to prevent rotation of the sticker cartridge 2 with respect to the guiding sleeve 20 around the longitudinal axis thereof.

FIG. 2A shows that the cartridge sleeve 30 has a ledge 38 at a distance H from and parallel to the top edge 36, which ledge 38 divides the cartridge sleeve 30 into a lower sleeve part 39 and an upper sleeve part 40, wherein the upper sleeve part 40 has an inner diameter which might differ from or is equal to the inner diameter of the lower sleeve part 39. The outer diameter of the cartridge sleeve 30 is substantially equal over the complete height of the cartridge sleeve 30.

FIG. 2A further shows that the cartridge sleeve 30 has an upper opening 35 at the top end thereof, which is the end directed towards the sticker placer 12. The upper opening 35 is bound by a top edge 36. At or near the top edge 36 the cartridge sleeve 30 is provided with two opposite first coupling members 37 for coupling the sticker cartridge 2 to the sticker placing device 1 in a removable manner. As best shown in FIG. 3B the first coupling members 37 of the cartridge sleeve 2 have a saw-tooth shape, wherein the first coupling members 37 extend over a length C in a direction parallel to the longitudinal direction of the cartridge sleeve 2. The saw-tooth shape of each of the first coupling members 37 comprises alternately inclined ascending flanks and steep transitions from the one to the next saw-tooth, wherein the inclined flanks are ascending in a direction towards the dispensing opening 31.

Figure 3A:
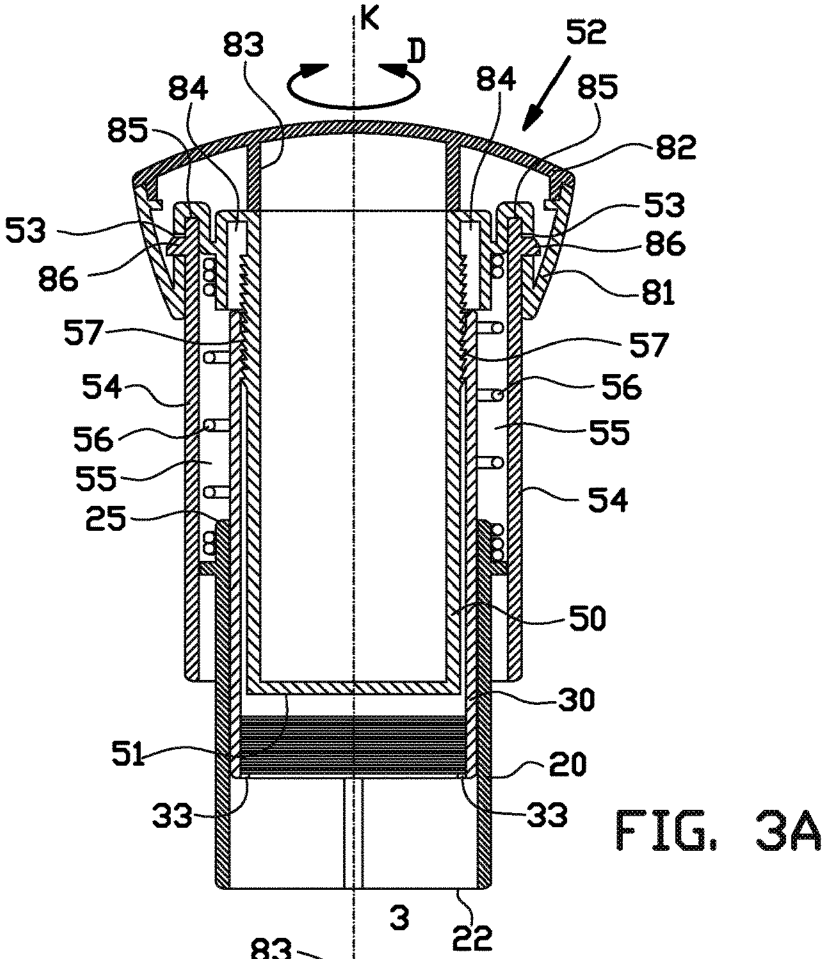
FIG. 3A shows a cross-section view of the sticker placing device with the inserted sticker cartridge along line as shown in FIG. 1A
Figure 3B:
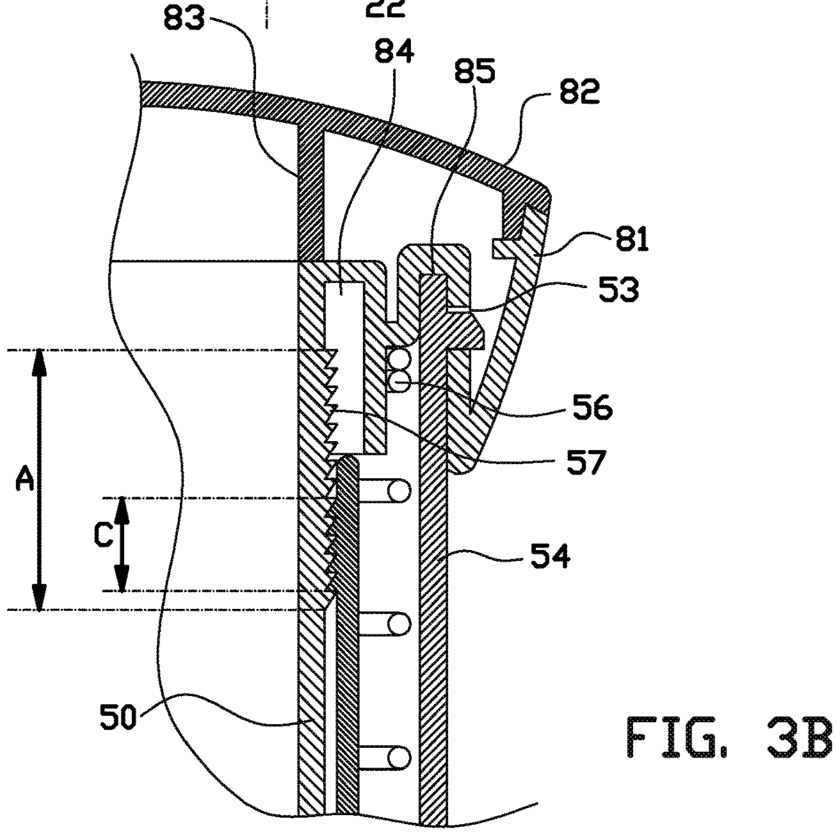
FIG. 3B shows a detail view of the cross-section view of FIG. 3A according to line 3B in FIG. 3A.

As shown in FIG. 3A the sticker placer 12 comprises a cylindrical pusher 50, preferably a hollow tubular pusher. The cylindrical pusher 50 extends in a longitudinal direction parallel to the longitudinal axis L of the guiding sleeve 20 and has a pushing face 51 at the end thereof which faces the lower opening 22 and is adapted to push against the upper sticker 3 of the stack of stickers 3 in the sticker cartridge 2.

The sticker placer 12 further comprises an engagement head 52 rotationally fixed to the top side of the cylindrical pusher 50, such that the cylindrical pusher 50 is rotated together with the engagement head 52 when the engagement head 52 is rotated by a user. The engagement head 52 has a lower head part 81 and an upper head part 82, wherein the upper head part 82 is removable connected to the lower head part 81 for getting access to the inside of the sticker placing device 1. The upper head part 82 is provided with a reinforcing cylinder 83 which extends downwards from the upper head part 82 towards the pusher 50, wherein the lower edge of the reinforcing cylinder 83 abuts against the top side of the pusher 50. It is shown that the lower head part 81 is provided with a first notch 84 for receiving a least a part of the sticker cartridge 2.

FIG. 3B shows that the engagement head 52 extends radially outwards and beyond the outer circumference of the guiding sleeve 20. It is shown that the lower head part 81 is provided with a first receiving notch 84 for receiving a least a part of the sticker cartridge 2. A second receiving notch 85 is provided in the lower head part 81 of the engagement head 52, which is adapted for rotatable receiving an engagement sleeve 54 which extends downwards parallel to the longitudinal direction of the cylindrical pusher 50, preferably to a height equal to the dispensing opening 31 of the sticker cartridge 2 when the sticker placing device 1 is in the rest position. The engagement sleeve 54 has two opposite outwardly projecting projections 86 with respect to the longitudinal axis L, which are received within two opposite movement openings 53 in a side wall of the second receiving notch 85 for holding the engagement head 52 in place with respect to the pusher 50. Although not shown in the figures, the movement openings 53 extend over a part of the side wall in the circumferential direction D.

FIG. 1C shows that the engagement sleeve 54 has an orientation ring 70 surrounding the guiding sleeve 20, which orientation ring 70 is connected to the engagement sleeve 54 by means of connector elements 71. Orientation indentations 72 are provided at the inner circumference of the orientation ring 70, which orientation indentations 72 are configured for cooperating with the first orientation ribs 26 of the guiding sleeve 20 for preventing rotation of the engagement sleeve 54 with respect to the guide sleeve 20 around the longitudinal axis thereof.

As shown in FIG. 3A a space 55 is present between and delimited by the outside of the cylindrical pusher 50 and the inside of the engagement sleeve 54. A biasing spring 56 is provided within the space 55, which biasing spring 56 on one end is secured to the engagement head 52 of the sticker placer 12 and at the other end to the connecting edge 25 of the guiding sleeve 20 or adjacent thereto. The biasing spring 56 is adapted to bring the sticker placer 12 into the resting position when no downwards force is applied to the sticker placer 12 or when the downwards force to the sticker placer 12 is removed. Furthermore, the biasing spring 56 biases the engagement head 80 into a coupling position, in which the sticker cartridge 2 is or may be coupled to the sticker placer 12. The space 55 is adapted to receive to guiding sleeve 20 when the sticker placing device 1 is in the placing position, as shown in FIG. 1B.

As shown in FIG. 3A the cylindrical pusher 50 is placed inside the cartridge sleeve 30 which is placed partially in the space 55 between the outside of the cylindrical pusher 50 and the inside of the engagement sleeve 54. The cylindrical pusher 50 comprises two opposite second coupling members 57 which are provided at the outside of the cylindrical pusher 50 and are adapted for coupling with the first coupling members 37 of the sticker cartridge 2.

FIG. 3B shows that the second coupling members 57 of the sticker placer have a saw-tooth shape, wherein the second coupling members 57 extend over a length A in a direction parallel to the longitudinal direction of the cylindrical pusher 50. The saw-tooth shape of each of the second coupling members 57 comprises alternately inclined ascending flanks and steep transitions from the one to the next saw-tooth, wherein the inclined flanks are ascending in a direction away from the lower opening 22 of the guiding sleeve 20. As shown in FIGS. 3A and 3B the length A over which the second coupling members 57 extend is larger than the length C over which the first coupling members 37 extend. Further, it is clearly shown in FIGS. 3A and 3B that the flanks of the saw-tooth shape of the first coupling members 37 are inclining in a direction opposite to the direction of inclination of the flanks of the saw-tooth shape of the second coupling members 57. Due to the respective orientation of the flanks of the saw-tooth of the first and second coupling members 37, 57, a one-way coupling is provided between the sticker cartridge 2 and the sticker placing device 1.

The first and second coupling members 37, 57 are positioned in such way that when the sticker cartridge 2 is inserted into the sticker placing device 1 while being orientated due to the cooperation between the orientation grooves 23 and the orientation ribs 34, the first and second coupling members 37, 57 are brought into engagement with each other. When the sticker cartridge 2 is inserted into the sticker placing device 1, the first coupling members 37 engage the second coupling members 57 at a group of teeth located at the underside of the second coupling members 57 as is shown in FIGS. 3A and 3B. During use, the first coupling members 37 move stepwise in the insert direction I relative to the second coupling members 37 for keeping the pushing face 51 of the cylindrical pusher 50 in contact with the upper sticker 3 of the stack of stickers 3 within the sticker cartridge 2. If the first coupling members 37 reach a group of teeth of the second coupling members 57 at the top side thereof, the sticker cartridge 2 is empty and has to be replaced by another one.

It is noted that the sticker cartridge 2 may be placed in the sticker placing device 1 without the first and second coupling members 37, 57 being brought into engagement with each other. Due placing a sticker 3 on the paper sheet with the sticker placing device, the sticker placer 12 is moved towards the sheet of paper and thus are the first and second coupling members 37, 57 moved towards each other and are brought into engagement with each other. The cartridge sleeve 2 may thus be coupled with the sticker placing device 1 by placing a sticker 3 on a surface.

In order to remove the sticker cartridge 2, the engagement head 52 has to be rotated from a coupling position, in which the sticker cartridge 2 is coupled to the sticker placing device 1, towards a release position, in which the sticker cartridge 2 is released from the sticker placing device 1. By rotating the engagement head 52, the cylindrical pusher 50 with the second coupling members 57 is also rotated, thereby moving the second coupling members 57 away from and out of engagement with the first coupling members 37 of the sticker cartridge 2. When the first and second coupling members 37, 57 are no longer in engagement with each other, the sticker cartridge 2 falls out of or can be removed from the sticker placing device 1. Since the biasing spring 56 is connected to the engagement head 52, the engagement head 52 moves back to the coupling position under influence of spring force of the biasing spring 56.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A sticker placing device for placing stickers and/or patches onto a surface such as a paper sheet, the sticker placing device comprising:

a cylindrical guiding body having an upper end with an upper opening, a lower end with a lower opening and a guiding channel extending between the lower end and the upper end;

a sticker cartridge for holding a stack of stickers and/or patches, which sticker cartridge is insertable in an insert direction into the guiding channel via the lower opening, wherein the sticker cartridge comprises a tubular cartridge body with a dispensing opening and an upper opening; and a sticker placer which is moveable connected to the guiding body and which comprises a pusher which extends at least partly into the sticker cartridge and the guiding body via the upper opening of the sticker cartridge and the upper opening of the guiding body for pushing onto the stack of stickers and/or patches within the sticker cartridge, wherein the sticker placer is moveable between a rest position, in which the sticker placer is located at or near the upper end of the guiding body, and a placing position, in which the guiding body is positioned within the sticker placer and the sticker and/or patch is stuck to the surface, wherein the sticker cartridge comprises first coupling members and the sticker placer comprises second coupling members, wherein the first and second coupling members are configured to form a one-way coupling, wherein the one-way coupling allows movement of the sticker cartridge in the insert direction and blocks movement in a direction opposite to the insert direction, and wherein each of the first and second couplings members has a saw-tooth shape comprising alternately inclined ascending flanks and steep transitions from the one to the next saw-tooth.

2. The sticker placing device according to claim 1, wherein the sticker placer is rotatable around the longitudinal axis of the guiding body with respect to the guiding body, wherein the sticker placer is rotatable between a coupling position, in which the first and second coupling members are in engagement or may be brought into engagement with each other, and a release position, in which the first and second coupling members are out of engagement and movement of the sticker cartridge in a direction opposite to the insert direction is allowed.

3. The sticker placing device according to claim 2, wherein the pusher is a cylindrical pusher with a pushing face directed towards the stack of stickers and/or patches in the sticker cartridge, wherein the first coupling members are located at the inner surface of the tubular cartridge body of the sticker cartridge, and the second coupling members are located at the outer surface of the cylindrical pusher adjacent to the first coupling members when the sticker placer is in the coupling position.

4. The sticker placing device according to claim 3, wherein the first coupling members circumferentially extend over a part of the inner surface, and the second coupling members circumferentially extend over a part of the outer surface of the cylindrical pusher.

5. The sticker placing device according to claim 1, wherein the first coupling members extend over a first length in a direction parallel to the longitudinal direction of the guiding body, and the second coupling members extend over a second length in a direction parallel to the longitudinal direction of the guiding body, wherein the second length is larger than the first length.

6. The sticker placing device according to claim 1, wherein the sticker placer comprises an engagement head which is connected to the top side of the pusher and extending radially outwards therefrom.

7. The sticker placing device according to claim 6, wherein the engagement head extends radially outwards beyond the outer circumference of the guiding body.

8. The sticker placing device according to claim 6, wherein the engagement head is rotationally fixed to the pusher.

9. The sticker placing device according to claim 6, wherein the engagement head is provided with a first receiving notch for receiving at least a part of the sticker cartridge.

10. The sticker placing device according to claim 6, wherein the sticker placer comprises an engagement sleeve positioned around the pusher and the guiding body and extending parallel to the longitudinal axis thereof, and wherein the engagement head is provided with a second receiving notch for receiving at least a part of the engagement sleeve.

11. The sticker placing device according to claim 9, wherein the engagement head comprises a lower head part and an upper head part which is removable connected to the lower head part, wherein the first and/or second receiving notch is provided in the lower head part.

12. The sticker placing device according to claim 10, wherein the engagement sleeve comprises one or more projections projecting radially inwards or outwards with respect to the longitudinal axis of the guiding body, wherein the second receiving notch is provided with one or more movement openings in one of the side walls thereof, which one or more movement openings extend over a part of the side wall in the circumferential direction.

13. The sticker placing device according to claim 11, wherein the upper head part comprises a reinforcing member which abuts the top side of the pusher when the upper head part is connected to the lower head part.

14. The sticker placing device according to claim 10, wherein the engagement sleeve and the engagement head are rotational with respect to each other around the longitudinal axis of the guiding body.

15. The sticker placing device according to claim 10, wherein a space is present between and delimited by the outside of the pusher and the inside of the engagement sleeve, wherein the sticker cartridge is at least partially positioned within the space.

16. The sticker placing device according to claim 15, wherein a biasing spring is provided within the space, which biasing spring on one end is secured to the sticker placer and at the other end to the guiding body, wherein the biasing spring biases the sticker placer into the rest position.

17. A sticker placing device for placing stickers and/or patches onto a surface such as a paper sheet, the sticker placing device comprising:

a cylindrical guiding body having an upper end with an upper opening, a lower end with a lower opening and a guiding channel extending between the lower end and the upper end;

a sticker cartridge for holding a stack of stickers and/or patches, which sticker cartridge is insertable in an insert direction into the guiding channel via the lower opening, wherein the sticker cartridge comprises a tubular cartridge body with a dispensing opening and an upper opening; and a sticker placer which is moveable connected to the guiding body and which comprises a pusher which extends at least partly into the sticker cartridge and the guiding body via the upper opening of the sticker cartridge and the upper opening of the guiding body for pushing onto the stack of stickers and/or patches within the sticker cartridge, wherein the sticker placer is moveable between a rest position, in which the sticker placer is located at or near the upper end of the guiding body, and a placing position, in which the guiding body is positioned within the sticker placer and the sticker and/or patch is stuck to the surface, wherein the sticker cartridge comprises first coupling members and the sticker placer comprises second coupling members, wherein the first and second coupling members are configured to form a one-way coupling, wherein the one-way coupling allows movement of the sticker cartridge in the insert direction and blocks movement in a direction opposite to the insert direction, wherein the first coupling members comprise two opposite first coupling members, and wherein the second coupling members comprises two opposite second coupling members.

18. The sticker placing device according to claim 17, wherein the inclined flanks of the first coupling members are ascending in a direction towards the dispensing opening of the sticker cartridge, and wherein the inclined flanks of the second coupling members are ascending in a direction opposite to the direction of inclining of the flanks of the first coupling members.

19. A sticker placing device for placing stickers and/or patches onto a surface such as a paper sheet, the sticker placing device comprising:

a cylindrical guiding body having an upper end with an upper opening, a lower end with a lower opening and a guiding channel extending between the lower end and the upper end;

a sticker cartridge for holding a stack of stickers and/or patches, which sticker cartridge is insertable in an insert direction into the guiding channel via the lower opening, wherein the sticker cartridge comprises a tubular cartridge body with a dispensing opening and an upper opening; and a sticker placer which is moveable connected to the guiding body and which comprises a pusher which extends at least partly into the sticker cartridge and the guiding body via the upper opening of the sticker cartridge and the upper opening of the guiding body for pushing onto the stack of stickers and/or patches within the sticker cartridge, wherein the sticker placer is moveable between a rest position, in which the sticker placer is located at or near the upper end of the guiding body, and a placing position, in which the guiding body is positioned within the sticker placer and the sticker and/or patch is stuck to the surface, wherein the sticker cartridge comprises first coupling members and the sticker placer comprises second coupling members, wherein the first and second coupling members are configured to form a one-way coupling, wherein the one-way coupling allows movement of the sticker cartridge in the insert direction and blocks movement in a direction opposite to the insert direction, and wherein the guiding body has orientation grooves and first orientation ribs and the sticker cartridge comprises second orientation ribs adapted for cooperation with the orientation grooves of the guiding body.

20. The sticker placing device according to claim 10, wherein the engagement sleeve has an orientation ring surrounding the guiding body, wherein orientation indentations are provided at the inner circumference of the orientation ring, which orientation indentations are configured for cooperating with the first orientation ribs of the guiding body.

21. The sticker cartridge for use in a sticker placing device according to claim 1.

22. The sticker placing device according to claim 1, wherein the first coupling members comprise two opposite first coupling members, and wherein the second coupling members comprises two opposite second coupling members.

23. The sticker placing device according to claim 1, wherein the guiding body has orientation grooves and first orientation ribs and the sticker cartridge comprises second orientation ribs adapted for cooperation with the orientation grooves of the guiding body.

* * * * *